Sept. 8, 1964     T. J. HILLIARD, JR     3,147,519
MOLD MAKING PROCESS AND APPARATUS Filed April 4, 1962                                                 4 Sheets-Sheet 1

Fig. 1.

INVENTOR.
Thomas J. Hilliard, Jr.
BY Green, McCallister & Miller
His attorneys Sept. 8, 1964　　　T. J. HILLIARD, JR　　　3,147,519

MOLD MAKING PROCESS AND APPARATUS

Filed April 4, 1962　　　　　　　　　　　　　4 Sheets-Sheet 3

INVENTOR.
Thomas J. Hilliard, Jr.

Sept. 8, 1964     T. J. HILLIARD, JR     3,147,519
MOLD MAKING PROCESS AND APPARATUS
Filed April 4, 1962     4 Sheets-Sheet 4

INVENTOR.
Thomas J. Hilliard, Jr.

United States Patent Office 3,147,519
Patented Sept. 8, 1964

3,147,519
MOLD MAKING PROCESS AND APPARATUS
Thomas J. Hilliard, Jr., 108 Woodland Road,
Pittsburgh 32, Pa.
Filed Apr. 4, 1962, Ser. No. 184,996
8 Claims. (Cl. 22—20)

This invention relates to the mold making art and particulary, to new and improved procedures and apparatus for making casting molds. It also deals with a new and improved core construction for use in casting molds.

A more specific phase of the invention deals with devising a core assembly for providing cores for a plurality of independent molds, such that the cores may be rigidly supported by adjoining structure in a spaced relationship for cooperation with a plural cavity mold assembly to form a multi-unit mold.

A feature of the invention involves forming a mold core integral with supporting base means or structure to facilitate handling and machine molding techniques. Other features of the invention involve the provision of a machine that will form a core within a core box and thereafter strip the core box from the core while holding the core in its position as formed for assembly with a mold or for other use; that will both form and assemble all of the required mold elements, i.e., cope, drag, and core, simultaneously, and at a single location to eliminate the need for a plurality of mold element conveyors; and that will simultaneously form two matching mold halves and the matching core, thereafter strip the mold halves from the patterns and strip the core box from the core, leaving the core in place where it was formed, and subsequently enclose the core by the matching mold halves, to form a complete mold with the cores in place.

In the molding arts, it is common practice to make casting molds of three elements to provide a mold cavity which will produce hollow castings. The elements include a pair of mold halves (a cope and drag) and a core member. It is the present practice to produce each of these elements at one or more stations, and to provide separate means for assembling the mold elements into a completed mold at another station. Not only are such separate processes time-consuming, but the equipment therefor, including conveyors and storage space, is expensive. Also, where mold elements must be moved or stored, they are subject to damage such as breakage, warpage, and moisture absorption.

Although it is known in the art to provide a mold containing several independent cavities for producing a plurality of castings, known processes require the individual placement of cores in each of these plurality of cavities and thus, impose further expense of time and labor involved in assembling the molds. Even where a single cavity is involved, it is common practice to insert and accurately position the core by hand. It is apparent that such an assembly method is quite susceptible to misalignment of the cores which will cause error in the castings, such as lack of concentricity, etc.

Recent developments in the molding arts have produced a process generally known as shell molding, in which a mixture of sand and a hardening resin binder provides bold elements which are relatively rigid, have accurate and fine surface finishes, and are thus particularly suitable for use in automatic mold production for producing a large number of high quality molds. The shell molding process is particularly useful in my machine, since certain of the manipulations of the completed mold elements require a substantial tensile strength of such elements. The utilization of shell molding in my machine facilitates relatively simple motions.

In view of the above-mentioned existing practices, it has been an object of my invention to completely automize the production of cored or three-element molds, to increase the rate of production and the uniformity of quantities of such molds, and to substantially reduce the cost involved in their production.

It has been another object of my invention to produce a single machine that can do all of the mold production steps automatically.

It has been another object of my invention to develop a method that is particularly adaptable to performance by a machine.

A further object of my invention has been to devise an improved core assembly that is particularly useful in accomplishing the performance of my method.

A still further object of my invention has been to produce an improved core box apparatus that is particularly adaptable to the automatic production of cores.

These and other objects will appear to those skilled in the art upon reading and understanding the following description with specific reference to the drawings, wherein:

FIGURES 4, 5 and 6 are respectively front, side sectional and back views in elevation of mounting plates which carry patterns and core box halves used in the machine of FIGURE 1 for producing molds in accordance with my inventive procedures; FIGURE 5 is a cross section taken along line V—V of FIGURES 4 and 6;

FIGURE 7 is an elevational end view of my machine illustrating mold ejection mechanism thereof;

The practice of my invention is accomplished by mold-forming means including mold-forming members that cooperate to provide chambers which can be filled with molding sand to form mold elements. The chambers may be located within the mold-forming means in positions parallel to each other and parallel to the assembled positions of the mold elements in the mold. Such an arrangement of mold-forming elements provides the most compact machine possible, considering the many required mold making operations.

My invention is particularly adaptable to molds for producing a large number of separate units, such as the pipe couplings illustrated; if applied to such a mold requirement, it is particularly useful for providing a plurality of core elements in a unitary assembly. Such an assembly may be handled either by the machine or by hand without upsetting the spaced relationship of the core elements; such relationship exactly corresponds to the spaced relationship of the cavities in their associated mold halves. Thus, by having a unitary core assembly, the accuracy and production rate of the completed molds, and hence of the produced castings, are not limited by tedious manipulations of manual positioning and the need for accurate core element locating heretofore involved. Also, my core assembly makes possible manipulations and handling for providing a completely automatic mold forming device.

Figure 1:
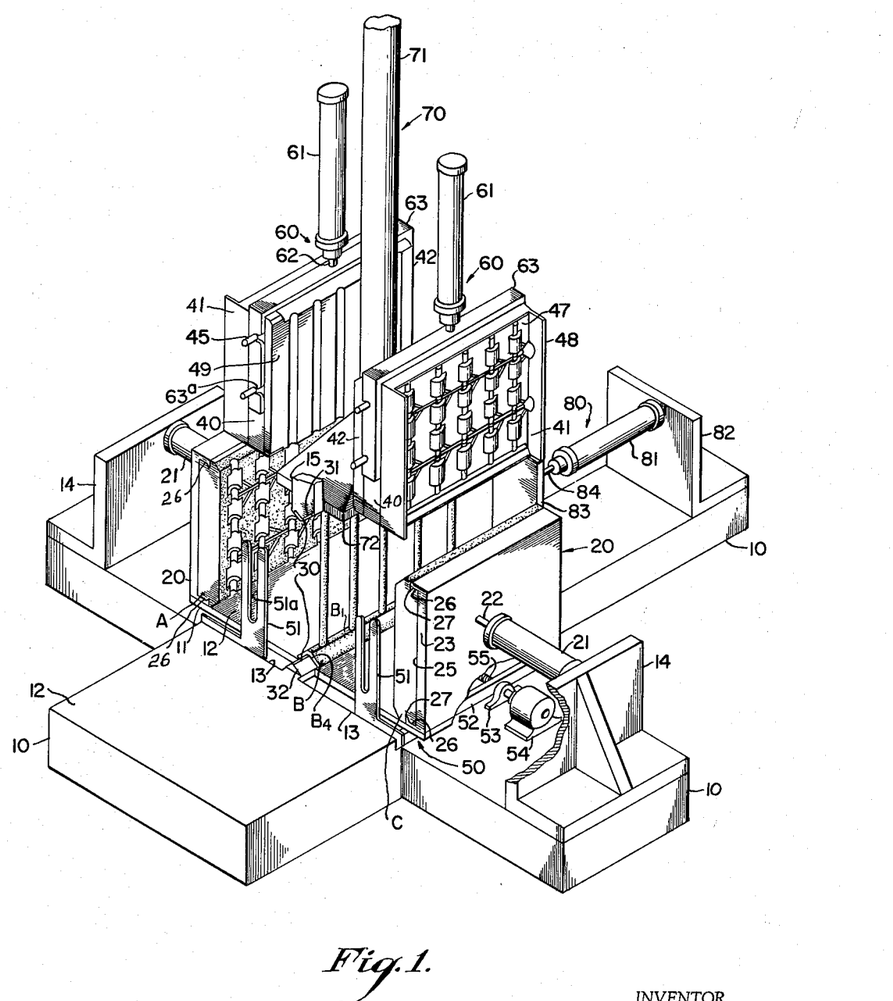
FIGURE 1 is a perspective view in elevation of a machine constructed in accordance with my invention and for performing the method of my invention; it shows mold elements produced by the employment of my invention.

In FIGURE 1, there is shown a machine for performing a method of my invention to provide a mold having three parts, i.e., a drag or mold part or half A, a core assembly or intermediate mold element or part B, and a cope or second mold part or half C. The mold thus formed is shown more clearly in FIGURE 2.

Figure 2:
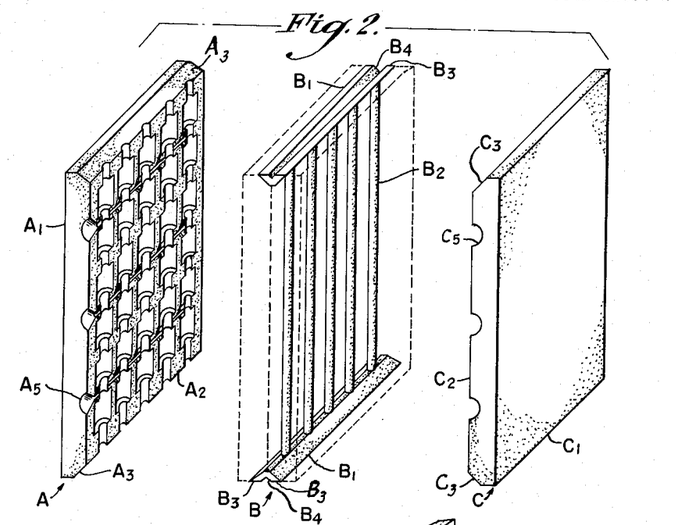
FIGURE 2 is an exploded perspective view of mold elements of my invention.

The drag A is shown as having a substantially rectangular body or backing portion $A_1$ and an inwardly-facing, cavity-containing, mold-forming portion $A_2$. Adjacent to upper and lower ends of the mold-forming portion, are outwardly-angled, recessed core assembly base receiving portions $A_3$.

The cope C is shown as having a backing or body portion $C_1$, a mold-forming portion $C_2$, and core assembly base receiving portions $C_3$, all similar to the drag A. Cavities formed in portion $C_2$ may be either similar or different from cavities in drag A, according to the requirements of the mold being formed. Suitable sprue cavities $A_5$ and $C_5$ are shown formed to provide inlets for molten metal.

The core assembly B is shown as having at least one base member, means or cooperating supporting portion $B_1$ and preferably, two (top and bottom) base members or means, one at the lower end and one at the upper end, for supporting longitudinal or vertical core members or molding portions $B_2$ at their ends or transversely within the machine and for accurately maintaining the spacing between and aligning the members of the core assembly, in order that the cores of the assembly can be positioned simultaneously and accurately within aligned cooperating cavities of the mold halves A and C. The base members $B_1$ of the core assembly B may take any suitable form; however, they are preferably of a triangular cross-sectional shape, as shown, and have a pair of substantially flat, horizontally-extending, outwardly-facing, offset, supporting surface portions or legs $B_3$ thereon for receiving a supporting member of the mold-making machine. A transverse or horizontal slot, groove or core-member-retaining surface $B_4$ is shown provided in each of the core assembly base means $B_1$ for retaining the core assembly in its lateral position within the mold-making machine, as described below. It will be noted that the groove $B_4$, while preventing lateral movement of the core assembly B, allows the assembly to be moved in the direction of the axis of the bases of the mold parts. If desired, the groove $B_4$ may be tapered, as shown in FIGURE 2, to facilitate movement of the core assembly longitudinally of the bases when the mold is ejected from the machine.

The assembled mold is shown by broken lines as applied to the core B in FIGURE 2. It will be seen that core base receiving portions of the mold halves $A_3$ and $C_3$ closely fit with the core assembly base $B_1$ to accurately position the core assembly with respect to the mold halves. Also, this arrangement provides a parting line or contiguous juncture on each side of the core assembly which extends to an external surface of the mold for allowing the escape of gas produced as the result of pouring the mold. This provides substantial gas communication between mold cavities and the atmosphere, in that the parting line between a core element or part and mold halves extends to at least one external surface of the mold assembly.

After ejection from the machine, the mold is in a position, as shown in FIGURE 2, and must be rotated 90° to a position wherein the sprue holes $A_5$, $C_5$ face upwardly for pouring of the castings.

Figure 9:
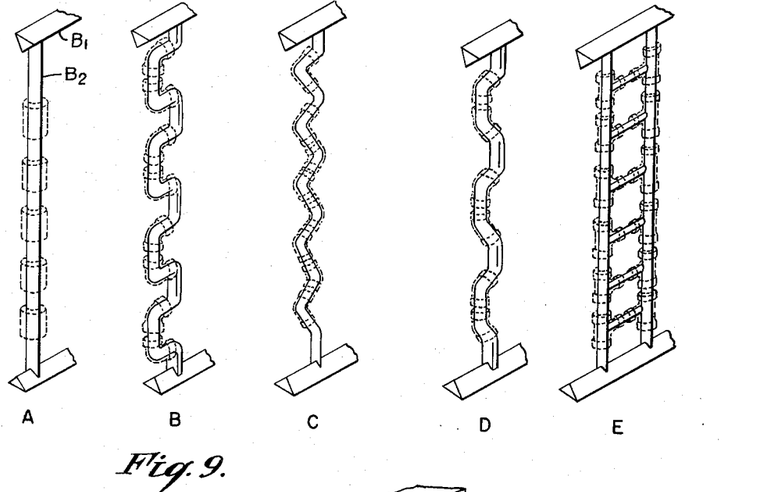
FIGURE 9 is a schematic illustration of alternative core and mold designs that may be used in practicing my invention.

While the mold cavities and the core assembly have been shown for purposes of illustration, as having a relatively simple design, for example, simple, straight tubular pipe couplings, my invention is equally adaptable to molds having core assemblies which are much more complex. For example, it is not necessary that the core assemblies be vertically straight, but they may take any suitable form that may be required by a mold. FIGURE 9 shows several representative core designs for application to castings, as outlined by broken lines. In FIGURE 9, A shows a core for making castings of the type contemplated in FIGURES 1 and 2. B and C of FIGURE 9 show alternative cores for producing 90° elbows; D shows a core for producing 45° elbows, and E shows a core design for producing T fittings.

Figures 10, 11, 12:
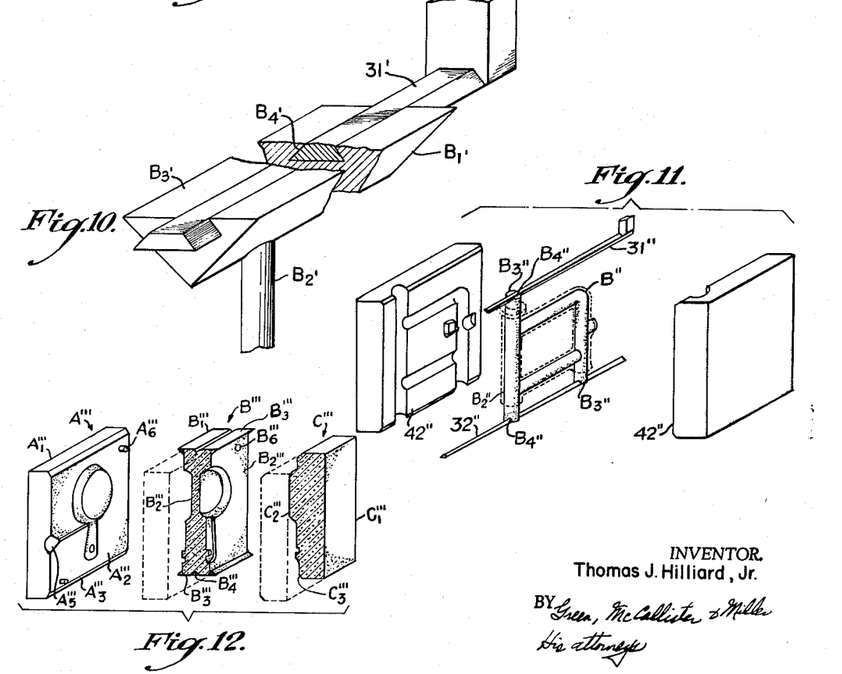
FIGURE 10 is a fragmental perspective view of a modification of a core assembly supporting structure that may be used instead of the supporting structure shown in the machine of FIGURE 1.
FIGURE 11 is an exploded perspective view of a core box constructed in accordance with my invention for producing a single core.
FIGURE 12 is an exploded perspective view of mold elements for casting two independent, non-cored articles; such elements may be employed in the machine of my invention as an alternative use thereof.

Also, my apparatus and procedure may be employed to produce single core elements of greater or lesser complexity, as shown in FIGURE 11. Core box halves $42''$ will form a core element $B''$ having outwardly-facing base or supporting portions $B_3''$ and a molding portion $B_2''$. The base portions may have slots $B_4''$ therein for receiving upper and lower core member cooperating, retaining or supporting means or base members $31''$ and $32''$, respectively. The core element shown is suitable for producing a casting, such as illustrated by the broken lines of the central portion of FIGURE 11. If desired, a plurality of such independent core elements may be formed and used in a machine without provision of an adjoining base member like $B_1$ of FIGURE 2. It will be noted that core box designs can be employed for such an arrangement, since it is not necessary to make a core base structure that is relatively difficult to form.

It is preferable that the cores of the assembly extend from an upper base to a lower base; however, it is within contemplation of my invention to provide core assemblies having a single base and core members attached thereto that are suitable for forming a dead-ended hole in castings. FIGURE 10 shows a special complementary dovetail groove design $B_4'$ in outwardly-facing structure $B_3'$ for use in core assemblies having a single base $B_1'$. The dovetail portion $B_4'$ holds the base in its vertical position as well as in its horizontal position by cooperation with retaining means $31'$. In this figure, $B_2'$ is representative of core members or molding portions.

A machine or apparatus for producing molds, such as those above described, is generally illustrated in FIGURE 1, and certain details are more clearly shown in FIGURES 3 through 7.

In FIGURE 1, the machine is shown as having as its essential operative elements, a working table 11, a pair of upright and opposed draw plates 20 which are movable horizontally across the table 11, core base-retaining means 30 located centrally of the table, a sand delivery means 70 located above a central portion of the table, and a pair of mounting plates 40. The plates 40 are vertically and horizontally movable as they are actuated by lift means 60 and traverse or carriage means 50, and carry a pair of mutually-opposed core box halves 42 and outwardly-facing pattern plates 41. The machine also includes a horizontally movable push-out means 80 that has an actuator 81.

More specifically, the machine has relatively stationary framework including a longitudinal supporting base structure or floor member 10 upon which is mounted a relatively flat platform or working table member 11. This table 11 is shown provided with a flat or planar upper surface 12 upon which the various machine members can slide and has a pair of transverse or widthwise-extending slots 13 that provide for horizontal movement of the traverse means 50. The platform or table member 11 is suspended in a spaced or elevated position with respect to the floor or supporting base structure 10 to provide clearance for supporting traverse carriage members 51 and for associated drive means 52, 53, 54 of the traverse means 50. This clearance is more clearly shown in FIGURE 7.

A pair of draw plate actuators or motor means 21 are securely mounted on or connected to the floor or base supporting structure 10 by vertically-extending, angle-shaped, bracket or brace members 14. The actuators 21 as well as actuators 61 and 81 may be of any suitable type, such as expandable-chamber or piston-operated hydraulic motors. The motors employed are provided with a controlled source (not shown) of hydraulic pressure, as is common in the servo motor art. Each motor 21 has a laterally-movable piston or actuator rod 22 which is operatively connected to a draw plate 20.

Two opposed, horizontally-movable, draw plates or mold half supporting members 20 are provided to form the supporting and forming structure for the mold cope C and drag A. The draw plates 20 are moved by the actuator 21 toward and away from one another along fixed paths which in the example shown in the drawings are both co-linear and rectilinear. The draw plates 20 have a body or backing plate member or portion 23 which is preferably substantially rectangular and extends vertically to a height substantially equal to the height of the mold to be produced. The body or backing plate portion 23 of each draw plate 20 is provided with heaters or heating means 24 (see FIGURE 3) or other suitable means for curing molding resins, such as means for injecting gaseous $CO_2$. The heaters 24 operate continuously to heat the inwardly-facing surface 25 of the backing plate to the predetermined temperature required for setting the resin in the molding sand.

Upper and lower, horizontally-extending, chamber, forming plate or frame portions 26 project inwardly adjacent top and bottom ends of the body or backing plate members 23 of the draw plate 20 to form an inwardly concave mold conforming portion. The frame portions 26 extend horizontally a distance sufficient to form a portion of the body member of the cope or drag, respectively. It is to be understood that the transverse width extent of each of the frame portions 26 is exaggerated somewhat for clarity of illustration. Each of the frame portions 26 is provided at its horizontally innermost edge with a vertically-inwardly-directed, triangular-shaped, drag plate gripping ridge, tooth or rim means 27. As is clearly seen in FIGURE 1, the gripping ridges or drag plate means 27 embrace corner portions of each of the cope and drag members A and C, in order that these members may be secured to the drag plate means during retraction from a central or mold blowing position. It will be noted that while the gripper ridges 27 retain the cope and drag within their respective draw plates as the draw plates are moved laterally-outwardly along the table, they allow the cope C and drag A to be moved forwardly of the machine with respect to the draw plates 20 by the push-out means 80. To facilitate this movement in a forwardly direction, each gripper ridge 27 may be tapered along its length from a larger depth at its rearward portion to a smaller depth at its forward portion.

A pair of upper and lower, vertically-opposed, spaced, core base-retaining, triangular-shaped, tracks or gripping bars 31 and 32 (see FIGURES 1 and 3) are provided in a central portion of the working table 11 to form the core-retaining means 30. As is seen in FIGURE 1, the bars 31 and 32 are stationary in relation to the draw plates 20 and cooperate with or fit-in the portion $B_4$ of each of the triangular-shaped core assembly base members $B_1$ to retain the core assembly B in its central position during movement of the other machine members away from this central poistion. In a manner similar to the gripping ridges 27 of the draw plates 20, the gripping bars 31 and 32 prevent lateral or sidewise movement of the core assembly, but allow forward movement as effected by the push-out means 80.

Figure 3:
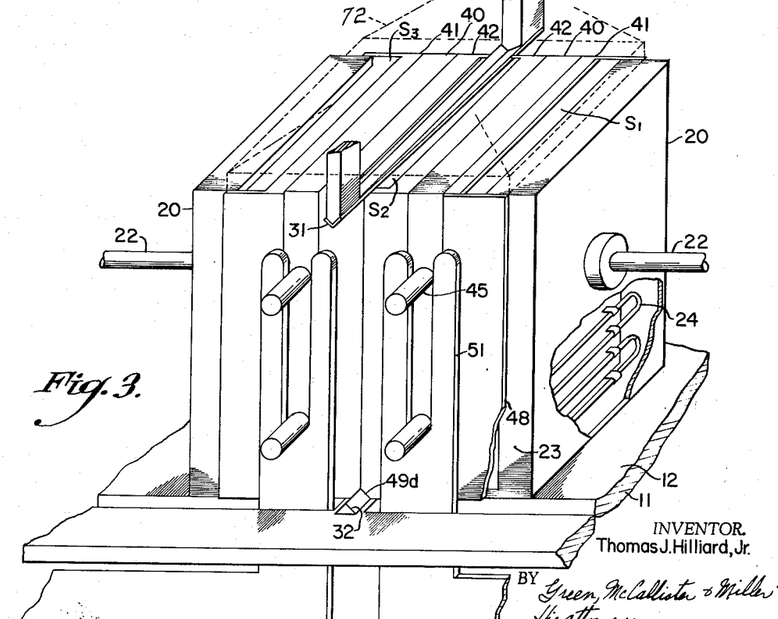
FIGURE 3 is an enlarged perspective view in elevation of mold forming elements of the machine when in a mold-forming or closed position.

The lower core-retaining gripping bar 32 is securely connected to the table surface 11 and extends a somewhat greater length than the desired length of the core base members $B_1$, as is shown in FIGURE 3, so that it extends outwardly of the core box halves 42 during the mold-forming operation. The core box halves 42 include, as will be discussed more in detail, surfaces thereon which cooperate with the core base-retaining means 30 to form a closed core box chamber, also as is shown in FIGURE 3.

Figures 4, 5, 6, 7:
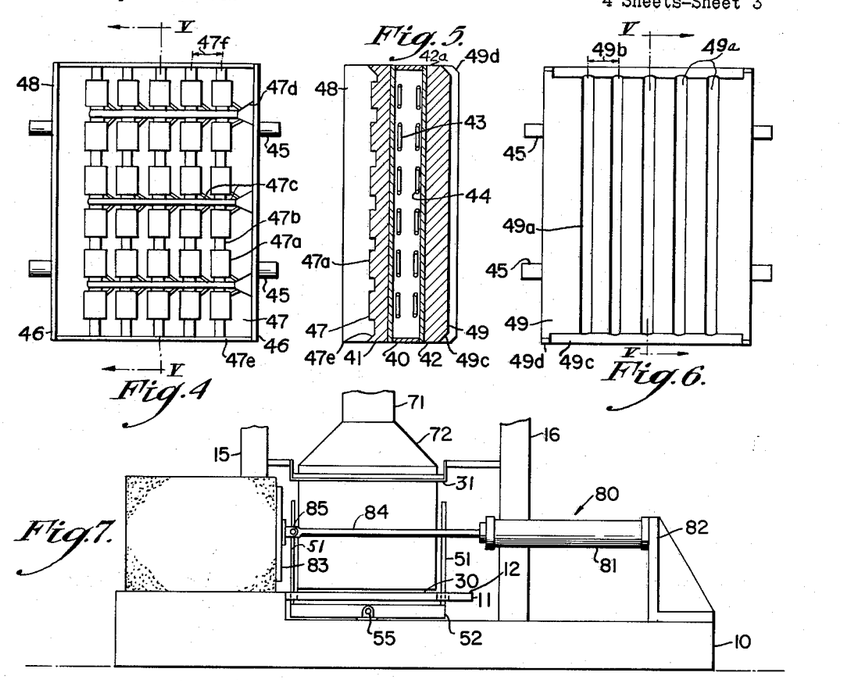

The upper core-retaining bar 31 is shaped externally similar to the lower core-retaining means 32 and is supported from the floor or supporting base structure 10 by any suitable means, such as by vertical side beams 15, 16 (see FIGURE 7). The upper core-retaining bar 31 extends longitudinally along upwardly-open core box inlet $S_2$, as is shown in FIGURE 3, to divide or separate the inlet into two smaller side openings. These openings correspond with the leg portions $B_3$ of the core assembly base member $B_1$ shown in FIGURE 2.

The core-retaining means may be tapered convergent toward the front of the machine, as is shown in FIGURE 3, to form the groove $B_4$ (see FIGURE 2) in the the core assembly base $B_1$ to facilitate forward movement of the core assembly B by the push-out means 80.

A pair of vertically and horizontally movable mounting plates 40 are provided for carrying pattern plates 41 and core box halves 42, as shown in FIGURE 5 to form a pair of pattern assemblies. Since the mounting plates 40, pattern plates 41, and core box halves 42 are substantially similar in each pattern assembly, only one of each will be described in detail.

The mounting plate 40 is a relatively hollow, vertical, substantially rectangular, box-like member that is suitable for supporting and carrying the pattern plate 41 on one side and the core box half 42 on its opposite side. Suitable resin curing or hardening means (see heater coils 43, 44 of FIGURE 5) is carried within the mounting plate to heat the supported pattern plate 41 and core box half 42, respectively. The coils 43, 44 are heated to a pre-determined controlled temperature at all times during the operation of the machine and may, as before intimated, be of any suitable construction, such as electrical resistance coils or fluid circulating coils. A pair of horizontally-extending, vertically-spaced, carriage pin members 45 (see FIGURES 4 and 5) are securely connected to the opposite front and back ends 46 of the mounting plate 40 for facilitating either machine or manual handling of the mounting plate 40.

The pattern plate 41 is removably connected to the mounting plate 40 and is provided with a pattern surface 47. The illustrated pattern has a plurality of raised, semi cylindrical members 47a for producing mold cavities that will, in turn, produce the outer surface of cylindrical articles. Smaller cylindrical connecting surfaces 47b are of a size to produce a cavity in the mold half for cooperating with adjacent portions of the core members $B_2$ of the core assembly and are of substantially the same diameter as such core members. The pattern surface 47 is shown as being raised portions 47c for forming a suitable gate structure in the mold half, and as having a sprue-forming conical surface 47d. The upper and lower horizontal edges of the pattern surface 47 are formed with outwardly-tapered, mold-half-face-forming surfaces 47e for producing the core base receiving surfaces $C_3$ in the cope.

The opposite vertical edges of the pattern plate 41 are provided with horizontally-outwardly-extending, vertical chamber-forming side flanges or flask walls 48. The flask walls 48 are of a location and dimension to overlap the body member 23 of the draw plate 20 when the pattern plate 41 and the draw plate 20 are in thier mutually cooperating mold-forming position, as is shown in FIGURE 3. In such overlapping position, the pattern plate 41 with its side flanges 48, the draw plate 20 and the upper surface 12 of the table 11 cooperate to provide a mold half forming chamber which is closed on three sides and has a sand inlet portion $S_1$ at its upper end, positioned beneath the blow head 72, see also FIGURES 1 and 7.

The mounting plate 40 carries on its side, opposite to the pattern plates 41, a core box half or other mold-forming pattern means 42 (see FIGURES 1 and 5). The core box half 42 includes pattern surface 49 which is shown as containing cylindrical impressions 49a for forming the veritcal, cylindrical core members $B_2$, and a second or inlet surface 42a. The impressions 49a are spaced-apart a distance 49b equal to the spacing 47f between the vertical pattern columns of the pattern plate 41, so that the produced core assembly B can be placed as a unit in a cooperating relationship with the finished mold halves A and C to simultaneously position all of the core members $B_2$ within the mold.

The upper and lower horizontal edges of the core pattern surface 49 are provided with outwardly-tapered, recessed portions 49c for forming the vertically-inwardly-facing surfaces of the triangular-shaped core assembly base members $B_1$. The portions 49c extend centrally transversely of the core box half 42, outwardly, up to a short distance of each of the vertical edges of the core pattern surface. It will be noted that the recessed portions 49c of the core pattern surface are substantially parallel to outwardly-projecting recess edge portions 47e of the pattern plate, since these surfaces are to form mold element surfaces which must be contiguous in the completed mold assembly.

The four corners of the core pattern surface are provided with outwardly-tapered corner recess portions 49d of lesser depth than the core assembly base-forming portions 49c. The portions 49d are positioned and shaped to cooperate with the core base-retaining bars 30 and 31 when the core box halves 42 are in their mutually contiguous, core-forming position, shown in FIGURE 3.

Separate means are provided, as shown in FIGURE 1, for horizontally and vertically moving the mounting plates 40, their associated pattern plates 41 and core box halves 42. Horizontally-moving, traverse means 50 is supported from beneath the table, as shown in FIGURES 1 and 7, and includes a pair of vertical, fork-shaped, side carriage or finger members 51 on its opposite sides. Each member 51 has an upwardly-open, carriage-pin-receiving slot or groove 51a formed therein. The carriage members 51 extend upwardly through the slot 13 in the working table and one pair at each transverse end of the means 50 is operatively connected to a transversely-extending end drive bar or member 52. A rotatable, threaded lead screw 55 (see FIGURE 1) extends through a centrally-located threaded bore in each carriage member 51 at opposite ends of the means 50 to carry them an advance and retract the means 50, as desired.

The lead screw 55 extends the width of the working table 11 and is provided with right and left-hand threads on its opposite end portions, respectively, whereby it drives both the carriage members 51 of the traverse means 50 together, either inwardly or outwardly. The lead screw 55 is rotatively supported at its opposite ends by suitable bearing stand means 53, as is shown in FIGURE 1, and is driven rotatively at one end by an electric motor 54 or other suitable drive means, such that rotation in one direction will cause it to move the drive bars 50, and hence the carriage means 51, inwardly toward the central portion of the working table 11. Conversely, rotation of the lead screw 55 in the opposite direction will cause the carriage members 51 to move outwardly away from the center of the table 11.

Offsetting means comprising pair of lift means or raising and lowering means 60, are rigidly hung above the floor or supporting base structure 10 by suitable means (not shown). Each lift means 60 preferably includes a hydraulic motor 61 having a piston rod 62 which is connected to a downwardly-open, U-shoped lift hook or bracket member 63. Each member 63 is provided with vertically spaced-apart horizontally-inwardly-open groove portions or slots 63a of a dimension and spacing for cooperating with and receiving the carriage pins 45 of the mounting plates 40.

The lift means 60 move the mounting plates 40 from the position shown in FIGURE 1, in which they are transversely offset from or horizontally clear of the draw plates 20, to a position upon the table 11, in which the carriage members 51 of the traverse means 50 (see FIGURE 3) receive the carriage pins 45. The pins 45 are then released from the slots 63a of the lift means 60 by moving the mounting plates 40 horizontally-inwardly of the machine.

The sand delivery means 70 is shown in FIGURES 1 and 7 and in phantom lines in FIGURE 3. This means includes a supply duct 71 and a blow head 72 which is located vertically above the central portion of the working table 11 to cover the area of the inlets $S_1$, $S_2$, and $S_3$ (see FIGURE 3) to the mold chambers that are formed by the mold chamber-forming draw plates, pattern plates, and core box halves when in their mutually cooperating position of FIGURE 3.

The blow head 72 is schematically shown and may be of any commercially available type that is of a sufficient size to supply the inlets $S_1$, $S_2$, and $S_3$ simultaneously. The blow head 72 constitutes means for supplying a mixture of a molding aggregate (usually sand) and a hardening resin to the sand inlets. As is well known in the art, the blow head includes a delivery plate (not shown) containing a plurality of appropriately located perforations communicating with the mold chamber inlets. Thus, sand contained within the blow head will pass to the mold chambers only under the influence of high pressure air from the supply duct 71. Also, it is contemplated that either the blow head 72 or the working table 11 will be vertically movable to facilitate motion of the machine parts and assure a tight or sealing fit between the blow head 72 and the machine parts during the blowing operation.

Although no venting structure has been shown, provision for venting the high pressure air accompanying the mixture of resin and sand into the mold cavities may be provided in accordance with well known principles. Such venting may obviously be placed in the table 11 as well as the side flanges or flask walls 48, if necessary.

The mold push-out mechanism or ejection means 80 is shown in FIGURE 1 and is more clearly shown in FIGURE 7. This mechanism includes a hydraulic motor 81 which is mounted by a bracket or other means 82 on the floor 10. Motor 81 is connected to a push-plate 83 through a piston rod 84 and a suitable connection 85. The push-plate 83 has outer dimensions somewhat smaller than the end dimensions of the finished mold assembly, in order that it will not interfere with the drag plate gripping ridges 27 or the core retaining means 30.

Figure 8:
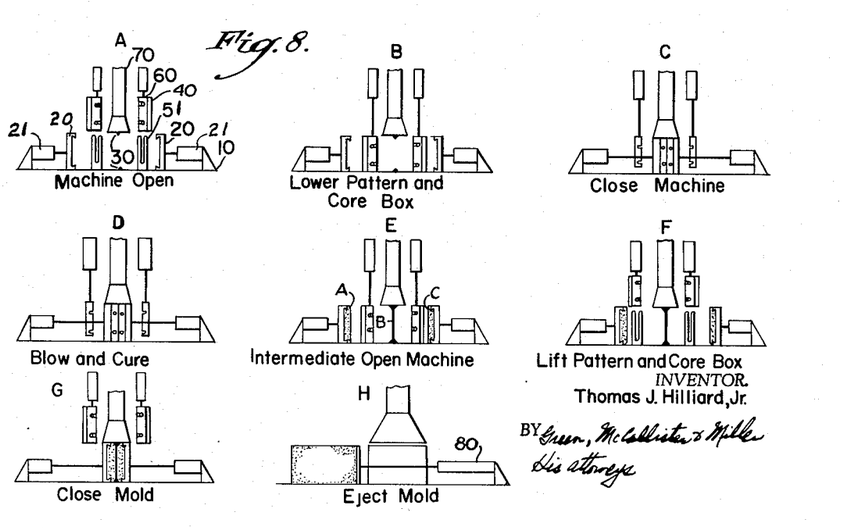
FIGURE 8 is illustrative of sequential operating positions of my machine in performing procedures of my invention.

The OPERATION of the machine thus described will now be summarized with specific reference to FIGURE 8. This figure schematically shows the operative elements of the machine illustrated in FIGURE 1. POSITION F of FIGURE 8 illustrates the position of the machine as illustrated in FIGURE 1. When the machine is at POSITION A of FIGURE 8, it is similar to its position shown in FIGURE 1, except that the mold members A, B and C of FIGURES 1 and 2 have not been formed therein.

The machine is first moved to POSITION B wherein the lift means 60 have lowered the mounting plates 40 containing the pattern plates 41 and the core box halves 42 into engagement with the vertical carriage members 51 and thus, into cooperating alignment with the draw plates 20. The machine is next closed to POSITION C by carriage members 51 that are driven by the lead screw 55 to position the mounting plates in a central closed position on the table 11. The draw plates 20 are simultaneously moved by their respective motors 21 to a central position on the table. The cooperation of the various mold-forming elements of POSITION C is more clearly shown in FIGURE 3.

While in its lowered position, the blow head 72 supplies a high velocity stream of air, carrying with it a mixture of a molding sand and a hardening resin to the mold chambers through inlets $S_1$, $S_2$, and $S_3$. After the cavities have been filled, the mold forming elements remain closed until the resin curing or hardening means 24 (FIGURE 3), 43, and 44 (FIGURE 5) have set the resin, at least sufficiently to provide handleable mold elements. During the curing operation, the draw plate actuators may be moved inwardly somewhat to compress and increase the density of the mold halves being formed. Also, additional holding means or power mechanism may be provided for the actuators during the blowing operation to oppose the high internal pressure within the mold cavities. All of these operations occur at POSITION D of FIGURE 8.

After the mold elements A, B, and C of FIGURES 1 and 2 have been sufficiently cured or hardened, the draw plates 20 are retracted by the draw plate actuators 21, thus stripping the cured mold halves A and C from the pattern plates 47. The carriage means or members 51 of the traverse means 50 move outwardly (endwise of floor member 10) to simultaneously strip the core box halves 42 from the core assembly B and carry the mounting plates 40 to a position in which they are vertically clear of the blow head 72 and into open intermediate POSITION E of the machine. At the latter position, the carriage means 51 delivers the carriage pins 45 into engagement with the inwardly-open slots 63a of the U-shaped lift hooks or bracket 63. It will be noted that the core assembly B which was formed during the blowing operation is retained in its central position on the table 11 by the core-retaining bar means 30.

The lift means 60 are next actuated to vertically move or raise the mounting plates 40 to the POSITION F in which their lowermost portions are clear of or out of alignment with the area of horizontal movement of the draw plates 20. Next, the mold is closed (as shown by POSITION G) by moving the draw plates 20 and their contained mold halves A and C, inwardly by their associated actuating mechanisms 21, to embrace the core assembly B and complete the mold assembly production. Finally, while the draw plates 20 are maintained in their central position, the push-out mechanism 80 is actuated to engage the rearward edge of the completed mold assembly and push it forwardly-outwardly (sidewise of traverse means 50) to a forward position on the table 11, as shown by POSITION H and FIGURE 7. The mold assembly is then secured together by clamps or other means, as is well known in the art, and is ready to be moved to a pouring station.

It will thus be seen that the machine disclosed is capable of performing all of the necessary functions for automatically producing a completed cored mold assembly.

While the machine disclosed is an important phase of this invention, in and of itself, it also illustrates the inventive method comprising another important phase of this invention. It will be obvious to those skilled in the art that each of the steps of assembling the mold-forming elements, i.e., the draw plates, the pattern plates, and the core box halves, can be performed by hand, instead of automatically, by my novel and inventive procedural steps.

From my foregoing illustrative disclosure, it will be clear that I have also invented a new, useful, and improved core assembly, making possible a new and improved mold assembly method which is, in turn, particularly adaptable to a new and improved automatic machine for producing cored molds. In addition, I have disclosed a new and improved machine for making cored molds on a production line basis, whether or not the disclosed multiple cavity core assembly is employed.

Since a machine of the type disclosed will form an important part of any foundry installation, it is undesirable that it be idle during times when only non-cored molds are being produced. My new and improved mold making machine is capable of producing non-cored molds in a manner equally efficient to the method previously described with respect to the core molds. The only modification of the machine required is to substitute pattern surfaces for the core box halves and thus produce a central mold member which has a cope cavity surface on one half and a drag cavity surface on the other half, or two drag or cope surfaces on opposite halves for cooperating with the respective surfaces on each of the cope and drag members carried by the draw plates. The machine will thus produce two parallel sets of molds which can be poured simultaneously or independently, and it will not be required to stand idle at times when only non-cored molds are being produced.

In this connection, see FIGURE 12 which shows mold elements A''', B''', and C''' that functionally correspond to elements A, B, and C of FIGURE 2. The three-element mold shown has been designed for casting two back-to-back skillets. Drag, mold part or member A''' has a backing portion $A_1'''$, an inwardly-facing mold-forming portion $A_2'''$, alignment-assuring top and bottom edge recess portions $A_3'''$, and a sprue cavity $A_5'''$. Similarly, cope or mold part or member C''' has a backing portion $C_1'''$, a mold-forming portion $C_2'''$, alignment-assuring top and body edge recess portions $C_3'''$, and a sprue cavity (not shown). Intermediate mold part or member B''' has two opposite and independent mold-forming surfaces $B_2'''$, thereon. Base parts or members $B_1'''$ are provided with outwardly-facing surfaces $B_3'''$ that have sloped top and bottom side edges and each has a retaining groove $B_4'''$ therein. The mold elements may be provided with key elements, such as $A_6'''$ for cooperating with keyholes $B_6'''$ of the intermediate member B''' to further assure accurate positioning therebetween. It will be noted that forwardly-outwardly sloped top and bottom side edges of the parts $B_3'''$ of the member B''' are adapted to cooperatively align with recess or offset portions $A_3'''$ and $C_3'''$ of the members or parts A''' and C'''.

The description has been somewhat limited to representative operative elements of the machine, in order that the novel operating features thereof will be more readily understandable. However, many modifications will appear useful to those skilled in the art. For example, additional gripping ridges or teeth on the frame portions 26 or surfaces 25 may be employed to hold the cope and drag on their respective draw plates when large mold assemblies are to be produced. Also, it may be desirable to provide the surface 25 of each draw plate 20 with ridges to minimize and make uniform the wall thickness of the cope and drag wherever possible. In this manner, molding sand consumption may be minimized and a faster and more uniform curing operation obtained.

Although I have mentioned the use of a mixture of sand and a resin for making the mold halves or elements any suitable material may be used in this connection that is capable of soldifying or attaining a set during the operation of forming casting mold halves or elements and a unitary mold casting. Summarized briefly, in forming a unitary casting mold for use in casting molten materials (such as metals) to provide suitable cast articles, I employ a pair of mold parts which are first positioned in an opposed, longitudinally-spaced relation with each other and employ a core means that is first positioned in a transversely-spaced or offset relation with the mold-forming parts and in substantial transverse alignment with the spacing therebetween. In the illustrated embodiment, such core means has a pair of parts that are initially in a longitudinally-spaced relation with each other. The core means is moved transversely into a longitudinally-aligned position between the mold parts and carriage means is employed for moving the mold parts into a cooperating relation with the core means and for cooperating with means associated with the core means for moving the core parts into an assembled cooperating relation with each other. In this manner, I provide an assembly of the mold parts and the core means into which mold-forming material is introduced or poured.

Also, in the illustrated embodiment of FIGURE 1, the mold-forming parts are provided with means (such as heating means) for effecting a setting of the material within opposed side cavities defined between the core means and the mold-forming parts to form a pair of casting mold halves or elements. The core means is then withdrawn transversely from and into an offset relation with the mold parts and in such a manner as to leave the casting mold halves in position within the mold parts. Next, the mold parts are moved together into an assembled relation and the casting mold halves or elements are then set or formed into a unitary casting mold, as by the further application of heat through the agency of the mold parts. Finally, the unitary casting mold is ejected from between the mold parts by pusher means operated at right angles or transversely to the longitudinal plane of the movement of the mold parts for making the completely formed mold casting available for use. In the illustrated embodiment of FIGURE 1, the pusher means operates along the plane of the table as does the carriage means for the mold parts, while the means for moving the core means operates towards and away from the plane of the table or perpendicular thereto.

With reference to FIGURES 2 and 3, although I have shown internal base member support means, such as $B_3$, as of integral or one-piece construction with respect to the core members or elements $B_2$, and as adapted to cooperate with external support means or bars, such as 31 and 32, it will be apparent that, instead of such a combination, either external or internal support means may be employed alone in cooperation with ends of the core members or elements.

What I claim is:
1. Apparatus for making mold parts comprising:
a draw plate having one or more elongated gripping ridges securely connected thereto, all of the gripping ridges extending along mutually parallel lines that are substantially parallel to said draw plate,
a pattern plate means cooperable with said draw plate to provide a mold-part-forming cavity,
all of the gripping ridges projecting into the mold-part-forming cavity,
means for supplying a mixture of an aggregate and a hardening resin to the mold-part-forming cavity, and
means for hardening said resin to set said mixture,
whereby a mold part can be formed and held onto said draw plate by said gripping ridges and then removed from said gripping ridges by applying a force that is substantially parallel to said draw plate.

2. A mold making machine comprising:
a pair of draw plates,
actuator means for moving said draw plates toward and away from one another along fixed paths,
each of said draw plates having at least one elongated gripping ridge securely connected thereto, all of the gripping ridges extending along mutually parallel lines that are substantially perpendicular to said paths,
pattern plate means movable to and from a position between said draw plates, said pattern plate means being cooperable with said pair of draw plates to provide a pair of mold-half-forming cavities,
means for supplying a mixture of an aggregate and a hardening resin to the mold-half-forming cavities,
means for hardening said resin to set said mixture, and
ejection means for exerting a force parallel to said gripping ridges, on mold halves that have been formed by the machine to eject the mold halves from said draw plates.

3. A mold making machine as defined in claim 1 wherein said elongated gripping ridges are tapered convergent in the direction of said force.

4. A mold making machine comprising:
a pair of draw plates,
actuator means for moving said draw plates toward and away from one another along fixed paths,
a pair of core box halves, said core box halves having cooperable core pattern surfaces for providing a core-member-forming cavity when said core box halves are mutually contiguous,
a pair of pattern plates that are cooperable with said pair of draw plates to provide a pair of mold-half-forming cavities,
one of said core box halves and one of said pattern plates being mutually interconnected to provide a first pattern assembly,
the other of said core box halves and the other of said pattern plates being mutually interconnected to provide a second pattern assembly,
offsetting means for operatively engaging said pattern assemblies and moving said pattern assemblies into and out of the fixed paths of said draw plates,
means for operatively engaging said pattern assemblies when in the fixed paths of said drawn plates for moving said pattern assemblies toward each other to a cooperative relationship wherein said core box halves are mutually contiguous, and away from each other to positions wherein said pattern assemblies are operatively engaged by said offsetting means,
relatively stationary core member retaining means projecting into a core member when formed for preventing movement of the core member in the direction of the fixed paths of said draw plates,
means for supplying a mixture of an aggregate and a hardening resin to the mold-half-forming cavities and the core-member-forming cavity, and
means for hardening said resin to set the mixture.

5. A mold making machine comprising:
a pair of draw plates,
actuator means for moving said draw plates toward and away from one another along fixed paths,
each of said draw plates having at least one elongated gripping ridge securely connected thereto, all of the gripping ridges extending along mutually parallel lines that are substantially perpendicular to said paths,
a pair of core box halves, said core box halves having cooperable core pattern surfaces for providing a core-member-forming cavity when said core box halves are mutually contiguous,
a pair of pattern plates that are cooperable with said pair of draw plates to provide a pair of mold-half-forming cavities,
one of said core box halves and one of said pattern plates being mutually interconnected to provide a first pattern assembly,
the other of said core box halves and the other of said pattern plates being mutually interconnected to provide a second pattern assembly,
offsetting means for operatively engaging said pattern assemblies and moving said pattern assemblies into and out of the fixed paths of said draw plates,
means for operatively engaging said pattern assemblies when in the fixed paths of said draw plates for moving said pattern assemblies toward each other to a cooperative relationship wherein said core box halves are mutually contiguous, and way from each other to positions wherein said pattern assemblies are operatively engaged by said offsetting means, relatively stationary core member retaining means projecting into said core-member-forming cavity when said core box halves are mutually contiguous for forming a mutually-cooperating core-member-retaining-surface in a core member when formed, said core member retaining means comprising at least one elongated core member gripping bar that extends along a line parallel to the line of extension of said gripping ridges, means for supplying a mixture of an aggregate and a hardening resin to the mold-half-forming cavities and the core-member forming cavity, means for hardening said resin to set the mixture, and ejection means for exerting a force parallel to said gripping ridges and said gripping bar, on mold elements that have been formed by the machine to eject the mold elements therefrom.

6. A mold making machine as defined in claim 5 wherein said elongated gripping ridges and said elongated core member gripping bars are tapered convergent in the direction of said force.

7. A mold making machine comprising:

a horizontal working table, a pair of draw plates positioned on said table and lying in generally vertical parallel phanes, actuator means for moving said draw plates toward and away from one another over said table along fixed paths, each of said draw plates having a generally vertical backing plate and a pair of horizontal chamber forming plates which form an inwardly open configuration, a gripping ridge securely connected to each of said chamber forming plates, said gripping ridges extending along mutually parallel lines that are substantially perpendicular to said paths, a pair of core box halves, said core box halves having cooperable core pattern surfaces for providing a core-member-forming cavity when said core box halves are mutually contiguous, a pair of pattern plates that are cooperable with said pair of draw plates to provide a pair of mold-half-forming cavities, first and second mounting plates, each having a plurality of carriage pin members projecting outwardly therefrom, one of said core box halves and one of said pattern plates being mounted to opposed sides of said first mounting plate to provide a first pattern assembly, the other of said core box halves and the other of said pattern plates being mounted on opposed sides of said second mounting plate to provide a second pattern assembly, lift offsetting means for operatively engaging the carriage pins of said first and second pattern assemblies, and vertically moving said pattern assemblies onto and off of said table in the fixed paths of said draw plates, horizontal moving means for receiving and operatively engaging the carriage pins of said pattern assemblies when positioned on said table for moving said pattern assemblies toward each other to a cooperative relationship wherein said core box halves are mutually contiguous, and out from each other to positions wherein the carriage pins of said carriage assembly are operatively engaged by said lift offsetting means, relatively stationary core member retaining means projecting into said core member forming cavities when said core box halves are mutually contiguous for forming a mutually cooperating core member retaining surface in a core member when formed, said core member retaining means comprising a pair of elongated core member gripping bars that extend along a line parallel to the lines of extension of said gripping ridges, means for supplying a mixture of an aggregate and hardening resin to the mold-half-forming cavities and the core-member-forming cavity, means for hardening said resin to set the mixture, and ejection means for exerting a force parallel to said gripping ridges and said gripping bars on mold elements that have been formed by the machine to eject the mold elements therefrom.

8. A core making device comprising:

a pair of core box halves having mutually cooperating core pattern surfaces for providing a core-member-forming cavity when said core box halves are mutually contiguous, means for moving said core box halves along fixed paths toward each other to positions wherein said core box halves are mutually contiguous and form a cooperative relationship, and away from each other to positions wherein both of said core box halves are displaced from their respective positions of cooperative relationship, relatively stationary core member retaining means projecting into said core-member-forming cavity when said core box halves are mutually contiguous for forming a mutually-cooperative core-member-retaining surface in a core member when formed, said core member retaining means comprising at least one elongated core member gripping bar that extends along a line that is substantially perpendicular to said paths, means for supplying a mixture of an aggregate and a hardening resin to the core member forming cavity, means for hardening said resin to set the mixture, and ejection means for exerting a force parallel to said gripping bar on core members that have been formed by the device to eject the core members therefrom.

References Cited in the file of this patent

UNITED STATES PATENTS

| | | |
|---|---|---|
| 594,286 | Robinson | Nov. 23, 1897 |
| 839,748 | Genese | Dec. 25, 1906 |
| 1,034,334 | Bannister | July 30, 1912 |
| 1,371,271 | Stoney | Mar. 15, 1921 |
| 1,424,802 | Channon | Aug. 8, 1922 |
| 1,551,313 | Kocsis et al. | Aug. 25, 1925 |
| 2,266,887 | McCoy | Dec. 23, 1941 |
| 2,502,205 | Collins et al. | Mar. 28, 1950 |
| 2,752,646 | Lasater et al. | July 3, 1956 |
| 2,770,855 | Phillips | Nov. 20, 1956 |
| 3,010,167 | Kozinski | Nov. 28, 1961 |
| 3,077,014 | Jennings et al. | Feb. 12, 1963 |

FOREIGN PATENTS

| | | |
|---|---|---|
| 200,962 | Australia | June 23, 1955 |
| 813,064 | Great Britain | May 6, 1959 |

UNITED STATES PATENT OFFICE
CERTIFICATE OF CORRECTION

Patent No. 3,147,519                                                      September 8, 1964

Thomas J. Hilliard, Jr.

It is hereby certified that error appears in the above numbered patent requiring correction and that the said Letters Patent should read as corrected below.

Column 8, line 2, for "U-shoped" read -- U-shaped --; column 12, line 6, for the claim reference numeral "1" read -- 2 --; line 30, for "drawn" read -- draw --; same column 12, line 73, for "way" read -- away --; column 13, line 25, for "phanes" read -- planes --.

Signed and sealed this 16th day of February 1965.

(SEAL)
Attest:

ERNEST W. SWIDER                                          EDWARD J. BRENNER
Attesting Officer                                           Commissioner of Patents